Feb. 24, 1931.    A. HEWITT    1,793,483
ELECTRODEPOSITED DIAPHRAGM
Filed May 11, 1926    2 Sheets-Sheet 1
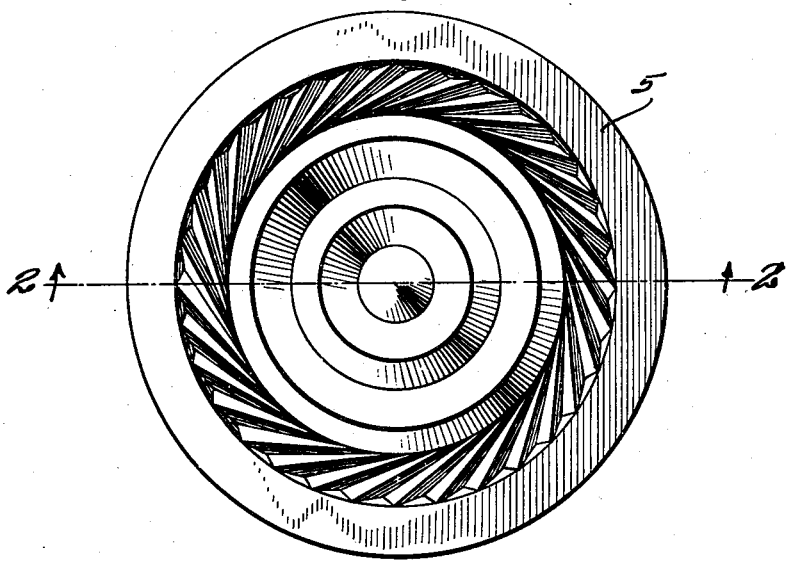

Feb. 24, 1931.     A. HEWITT     1,793,483
ELECTRODEPOSITED DIAPHRAGM
Filed May 11, 1926     2 Sheets-Sheet 2
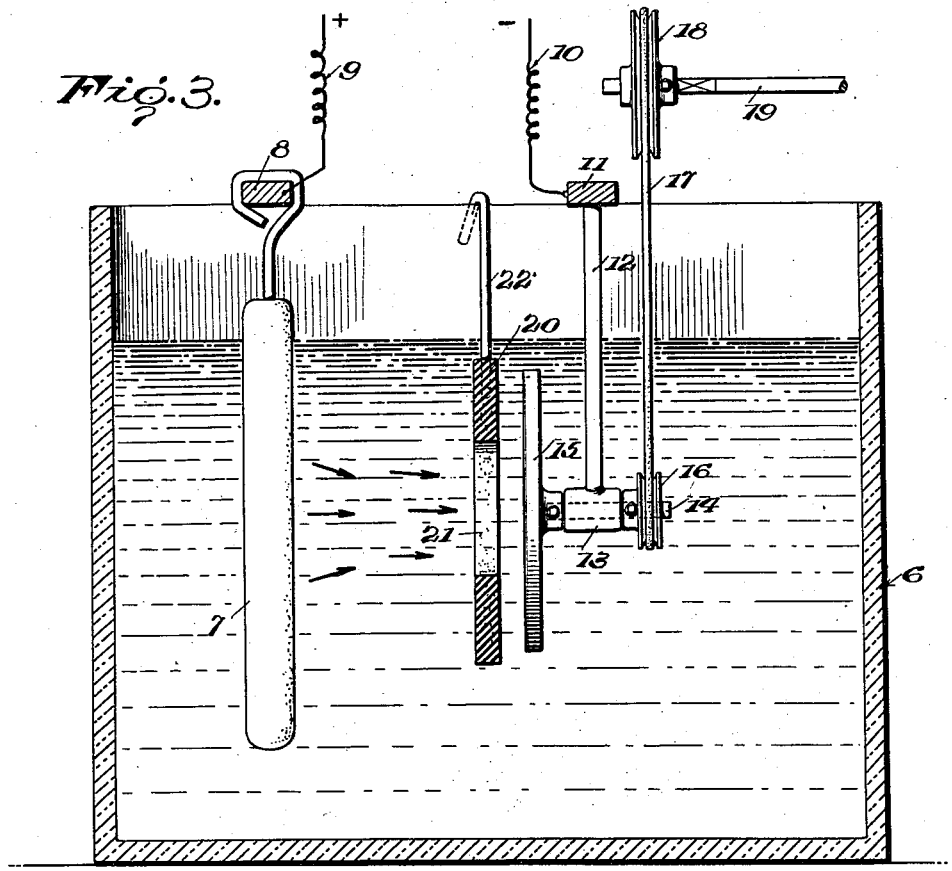
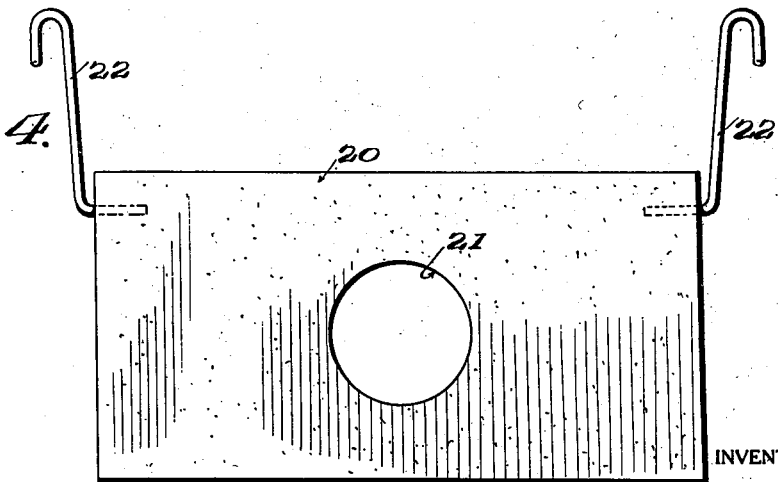
INVENTOR
Albertis Hewitt.
by Cameron, Kerkam & Sutton
ATTORNEYS Patented Feb. 24, 1931

1,793,483

UNITED STATES PATENT OFFICE

ALBERTIS HEWITT, OF PITMAN, NEW JERSEY, ASSIGNOR TO VICTOR TALKING MACHINE COMPANY, A CORPORATION OF NEW JERSEY

ELECTRODEPOSITED DIAPHRAGM

Application filed May 11, 1926. Serial No. 108,428.

This invention relates to diaphragms and methods of making the same.

It has long been recognized that certain metals, such as nickel for example, are not only suitable diaphragm materials, but desirable for this purpose because of their durability, the facility with which elements may be attached thereto, as by soldering or spot welding to avoid the difficulties heretofore encountered in securing a permanent and tight connection by waxing, etc. In view of the higher specific weight of metals, however, great difficulties have been experienced in obtaining a durable metal diaphragm which is both sufficiently light in weight and yet sufficiently rigid in structure to properly respond to and faithfully transmit the various frequencies encountered in the recording, transmitting and reproducing of sound.

It is an object of this invention to provide a metal diaphragm and method of making the same which enables a durable diaphragm to be made of a very thin metal, so that it is light in weight, and yet be made in such form as to be sufficiently rigid for proper response to the various frequencies of sound waves.

Various forms of diaphragms have heretofore been proposed whereby the diaphragm may be rendered relatively stiff and inflexible over certain portions thereof, as adjacent the center, and relatively flexible at other portions thereof, as adjacent the periphery, as by providing the diaphragm with suitably shaped and arranged corrugations. Considerable difficulty has been experienced, however, in forming diaphragms of this character by pressing the desired corrugations into a sheet of relatively thin metal, because, in order for the metal to withstand the deforming action of the dies, when relatively thin, it must be relatively soft and pliable. A diaphragm of this character, however, is difficult to handle; it is easily punctured by contact with any sharp instrument; and therefore it is easily injured or destroyed. Hence the assembling of structures employing such diaphragms is costly and laborious, and the diaphragm may be quickly destroyed by careless handling of the instrument after it has gone into service.

It is an object of this invention to provide a diaphragm and method of making the same whereby a metal diaphragm may be made of the desired thinness and have the desired corrugations or other conformation while at the same time it is durable and resistant, so that it is not easily damaged or destroyed under the normal conditions of handling in manufacture, assembling or service.

Another object of this invention is to provide a diaphragm and method of making the same whereby the diaphragm may be wholly composed of homogeneous resilient metal that is resistant to permanent deformation.

Another object of this invention is to provide a diaphragm and method of making the same whereby a diaphragm may be made which possesses different degrees of rigidity or flexibility at different portions thereof by varying the thickness of the metal at different portions of the diaphragm.

Another object of the invention is to provide a relatively light, rigid and durable diaphragm which is unaffected by atmospheric changes, which may be produced inexpensively, and which can be readily attached to other elements by soldering or spot welding.

Other objects will appear as the description of the invention proceeds.

A diaphragm illustrating an embodiment of the invention is shown on the accompanying drawings, but it is to be expressly understood that the conformation of the diaphragm as here shown has been taken for purposes of illustration only and is not to be construed as a definition of the limits of the invention.

In the drawings,

Fig. 1 is a plan view illustrating one form of diaphragm formed in accordance with the process of the present invention;

Fig. 2 is a sectional view taken on the line 2—2 of Fig. 1;

Fig. 3 is a sectional side view illustrating somewhat diagrammatically one form of apparatus which may be employed for carrying out the process of the present invention; and Fig. 4 is a side elevation illustrating one form of shield or baffle plate that may be employed for controlling the electrodeposition of metal on the cathode.

In accordance with the present invention a diaphragm 5, which may be plane or of any other suitable form, but which is preferably provided with corrugations as illustrated, is made by electro-depositing a relatively thin layer of any suitable metal, such as copper or nickel, preferably nickel, on a cathode mold of any suitable construction, and then stripping the deposit of metal therefrom.

The preferred procedure embodying the present invention includes the deposition of a relatively thin layer of nickel, on the order of, or less than, a thousandth of an inch in thickness, on a cathode mold provided with a face to conform with the desired conformation of the diaphragm, said mold being preferably provided with corrugations of the character illustrated on the drawings so that the resulting diaphragm shall be relatively stiff at its central portion and flexible at its peripheral portion. Said cathode may be made of wax, metal or any other suitable substance that will retain its shape in the bath and constitute a cathode. A nickel faced cathode or mold is preferred, and in order to effect the separation of the deposit, such cathode may be washed clean in running water, then immersed in a solution of bichromate of potash for about fifteen minutes, and then again washed in running water before placing in the electroplating bath.

The bath employed may be of any suitable character, but I prefer to employ a magnesium salt in the bath to render the nickel more ductile, so that it will not crack or peel back during the formation of the deposit. As an example of a proportion of constituents which I have found to be suitable, nine pounds of single nickel sulphate and four and one-half pounds of magnesium and ammonium sulphate are dissolved in eighteen gallons of water. The nickel anodes are preferably of the highest degree of purity obtainable.

The current supplied may be of any suitable strength and from any suitable source. A current of approximately two-tenths of an ampere has been found to be suitable. This corresponds to a current density of approximately .04 amperes per square inch and gives a deposit of approximately a quarter of a thousandth of an inch per hour. This is to be taken as exemplary only, however, as a faster rate of deposition may be used if desired, and if the bath is in good condition and the anode is fairly pure, the current strength may be increased to four or five tenths of an ampere with safety.

Suitable provision should be made for aiding the liberation of gas at the cathode. I have found that the quality of the deposit is materially improved and the deposit rendered not only dense and smooth but also resilient by agitating or rotating the cathode during the deposition, although some of the benefits of my invention may be obtained by agitating the bath by air jet, mechanically or in any other suitable way; or by brushing the cathode, and where the conformation of the cathode includes relatively deep recesses as in forming a corrugated diaphragm, an occasional brushing of the cathode may be used in conjunction with rotating the cathode, care being taken that the deposit does not become dry if the cathode is removed from the bath for the purpose of brushing the same.

The electrodeposition may be carried out so that the thickness of the deposit of metal is substantially uniform throughout, but it is frequently desirable to make the diaphragm of varying degrees of thickness in different portions thereof so that the diaphragm will have different degrees of rigidity in different portions thereof. The varying of the thickness of the deposit may be effected by positioning a shield or baffle plate in front of the cathode to control the rate of deposition on certain portions thereof. For example, if the diaphragm is to be thicker at the central portion than at the periphery, the shield or baffle may be a plate provided with a central aperture positioned in front of the cathode at a suitable distance therefrom. The size of the central opening will vary with the area of the central portion of the diaphragm which is to have a greater thickness, and the rate of decrease in thickness toward the periphery of the diaphragm may be controlled both by varying the size of the central aperture and by varying the distance of the baffle or shield from the diaphragm. By this procedure the electroplating may be carried on until the central portion of the diaphragm has the desired thickness, and a peripheral portion of gradually decreasing thickness toward the periphery will be formed simultaneously owing to the progressively decreasing rate of deposition toward the periphery that is effected by the use of the shield or baffle.

When a more abrupt change in thickness is desired the shield may be placed contiguous to or in contact with the deposit after a desired thickness has been obtained over the entire area of the diaphragm, so that the further deposition will be only on the unshielded portions of the cathode. For example, if the diaphragm is desired to be of a thousandth of an inch in thickness at the central portion and a half thousandth of an inch in thickness at the peripheral portion the electroplating may continue for two hours (assuming that the current rate is such that the metal is deposited at the rate of a quarter of a thousandth of an inch per hour), after which a shield may be placed around the peripheral portion of the cathode and the electroplating continued for another two hours until the central portion of the diaphragm has attained the desired thickness of a thousandth of an inch. If the shield is positioned at a distance from the cathode, the deposition will continue on the peripheral portion, but at a decreasing rate toward the periphery, and the resulting diaphragm will vary in thickness at a substantially uniform rate from a thousandth of an inch at the central portion to half a thousandth plus at the peripheral portion.

After the deposition of metal has been completed the peripheral edge of the deposit is turned off to free the deposit at the face of the cathode, after which the latter is stripped from the cathode, and may be trimmed to size.

One form of apparatus which may be employed in carrying out the method of the present invention is diagrammatically illustrated in Fig. 3, wherein a glass tank 6 contains the electrolyte. A nickel anode 7 may be suspended in the electrolytic bath by means of a supporting bar 8 which may be formed of metal to constitute a conductor to which is connected in any suitable manner one of the current supply leads 9, the other lead 10 being connected to a conducting and supporting bar 11, both of said bars being mounted on the upper edges of the walls of the tank 6. Attached in any convenient manner to the lower face of bar 11, or formed integrally therewith, is a downwardly extending support 12 provided at its lower end with a bearing member 13 in which is rotatably mounted a shaft 14. Secured in any suitable manner to the end of shaft 14 that extends toward the anode 7, is a cathode 15, preferably formed of nickel, said cathode constituting a mold provided with a face to conform to the desired conformation of the diaphragm. Fixedly attached to the opposite end of shaft 14 is a pulley 16 which may be driven by means of a suitable belt 17 passing over a driving pulley 18 fixedly secured to a shaft 19 which is adapted to be driven by a suitable prime mover (not shown). A shield or baffle plate 20 may be adjustably mounted intermediate anode 7 and cathode 15. In the form shown, the shield is constituted by a rectangular plate formed of any suitable material and provided adjacent the center thereof with an aperture 21. Hooks 22 may be secured to shield 20 adjacent the ends thereof, said hooks being adapted to slidably engage the upper edges of two opposite walls of the tank 6. Shield 20 is readily adjustable toward and away from the cathode and may be easily removed from the bath when desired. Bar 8 may be slid along the upper edges of the tank to adjust the distance between the cathode and anode.

I have found that a nickel diaphragm made in the manner heretofore described is smooth, dense and resilient. It can therefore be handled and bent within reasonable limits without permanent deformation or injury, which enormously facilitates the handling and assembling of the diaphragm with other elements. It is also relatively strong and not easily punctured by sharp instruments. As the deposit can be made relatively thin, the diaphragm may be made as light as desirable while, at the same time, as the cathode mold can be made of any desired conformation, the diaphragm may be given such a shape or form as to have the desired rigidity without increase in weight. As the corrugations are formed in the diaphragm during the deposit of the metal, the difficulties heretofore encountered in pressing corrugations into a very thin sheet of metal without breaking through the metal have been entirely obviated, while the resilient character of the metal that is produced renders the diaphragm much more durable and susceptible to handling than diaphragms heretofore obtained by pressing very thin sheets.

Moreover, the present invention provides a diaphragm which may vary in thickness at different portions; also one that is not affected by atmospheric changes; and one which can be easily assembled with other elements by use of soldering, spot welding, etc. At the same time the method of procedure is one that is relatively easy to carry out and therefore diaphragms of uniform quality may be made expeditiously and inexpensively in large commercial quantities without the use of highly skilled labor.

While the embodiment of the invention heretofore described and the exemplary procedure heretofore outlined have been described in considerable detail, it is to be expressly understood that the invention is not restricted thereto, as the invention is capable of a wide variety of embodiments, and can be carried out in a wide variety of ways, some of which will now readily suggest themselves to those skilled in the art, while changes may be made in details, proportions, etc., without departing from the spirit of this invention. Reference is therefore to be had to the appended claim for a definition of said invention.

What is claimed is:—

The method of making an acoustic diaphragm of very thin metal and of varying thickness which includes the steps of rotating a cathode mold having a corrugated surface, electrodepositing a relatively thin layer of metal of substantially uniform thickness over substantially the entire area of said cathode, continuing said electrodeposition while shielding portions of said cathode, and stripping the deposit from said cathode.

In testimony whereof I have signed this specification.

ALBERTIS HEWITT.